(12) United States Patent
Yee et al.

(10) Patent No.: US 12,153,984 B2
(45) Date of Patent: Nov. 26, 2024

(54) AUTHENTICATION CARD WITH INTEGRATED STITCHING

(71) Applicant: Capital One Services, LLC, McLean, VA (US)

(72) Inventors: Bryant Yee, Silver Spring, MD (US); Tyler Maiman, Melville, NY (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/157,043

(22) Filed: Jan. 19, 2023

(65) Prior Publication Data

US 2024/0249107 A1    Jul. 25, 2024

(51) Int. Cl.
*G06K 19/077*   (2006.01)
*B42D 25/45*   (2014.01)

(52) U.S. Cl.
CPC ....... *G06K 19/07749* (2013.01); *B42D 25/45* (2014.10)

(58) Field of Classification Search
CPC .. G06K 19/07749; G06K 19/00; G06K 19/04; G06K 19/07; B42D 25/45; G06Q 20/34; G06Q 20/341
USPC ................. 235/492, 380, 487, 375
See application file for complete search history.

(56) References Cited

U.S. PATENT DOCUMENTS

| | | | |
|---|---|---|---|
| 2009/0293565 A1* | 12/2009 | Seki | E05B 35/007 70/387 |
| 2013/0300101 A1* | 11/2013 | Wicker | B42D 25/00 283/67 |
| 2015/0072098 A1* | 3/2015 | Johnson | B32B 27/10 156/220 |
| 2019/0057294 A1* | 2/2019 | Suthar | B32B 27/308 |
| 2019/0065927 A1* | 2/2019 | Herrington | G06K 19/0772 |

FOREIGN PATENT DOCUMENTS

| | | | | |
|---|---|---|---|---|
| CA | 3149946 A1 | * | 4/2021 | ............. B42D 25/29 |
| JP | 2000501036 A | * | 2/2000 | ....... G06K 19/06037 |
| JP | 2008265248 A | * | 11/2008 | |

* cited by examiner

*Primary Examiner* — Edwyn Labaze
(74) *Attorney, Agent, or Firm* — Foley & Lardner LLP

(57) ABSTRACT

Authentication card with integrated stitching. In some aspects, an authentication card for short range wireless communications with an entity-specific stitching design includes at least one card layer comprising a first and second portion. The first portion may include a plurality of apertures provided on the first portion and a thread may be inserted through the plurality of apertures to create a stitching design, where the stitching can be used to identify an associated entity. A microchip may be provided on the second portion of the at least one card layer, wherein the microchip is coupled with an antenna enabling authentication (e.g., contactless) by employing radio frequency identification (RFID) or near field communication (NFC).

16 Claims, 15 Drawing Sheets

AUTHENTICATION CARD WITH INTEGRATED STITCHING

SUMMARY

As authentication cards (e.g., physical cards) are often similar or the same in terms of appearance, size and feel, it may be hard to distinguish cards associated with different entities and users at a glance. For example, most authentication cards are made with polyvinyl chloride acetate (PVCA or PVC) of a similar size. Typical authentication cards do not provide a tailored design.

For users with visual impairment, such as blindness, blurred vision, color-blindness, or in low-light environments it is often difficult to distinguish and identify different cards. For example, users with visual impairment often require tactile elements to distinguish between items, and users with limited visibility such as color blindness, often use other indicators such as design to distinguish items. Furthermore, for many entities, the ability to customize or differentiate from other brands is important to building recognition and building relationships with clientele.

In some examples, a cardholder may have to rely on details such as card number, or a selection of different images printed on the authentication card. However, with usage and time, images and card numbers often wear out quickly, and can make it hard or difficult to distinguish associated entities and cardholders identified on the card itself.

Accordingly, a mechanism is desired that would enable individuals or entities to allow customization of authentication cards such that cards specific to associated entities are easily identified by their holders, or by others. One mechanism to enable differentiation in cards, such as tactile differentiation, includes providing stitching designs that are unique to an entity or user. In particular, by using an authentication card for short range wireless communications with an entity-specific stitching design, a user, or system may be able to identify the card without relying on details such as a specific card number. The authentication card can also be embedded with a microchip coupled with an antenna to enable contactless authentication using radio frequency identification (RFID) or near field communication (NFC).

In some aspects, disclosed embodiments relate to an authentication card with integrated stitching. In some embodiments, integrated stitching may be stitching provided through at least one card layer of the authentication card. In some embodiments, an authentication card is provided. The authentication card can comprise one or more card layers. The authentication card can further comprise stitches sewn through the one or more card layers to provide a stitching design. The authentication card can further comprise a microchip, coupled with an antenna, to enable contactless authentication by employing radio frequency identification (RFID) or near field communication (NFC).

The one or more card layers can comprise plastic, metal, fabric, or a combination thereof. The one or more card layers can also comprise a first fabric layer, a second fabric layer, and a stiff substrate layer in between. The authentication card can further comprise an adhesive to fasten the one or more card layers together. The one or more card layers can further comprise a card design with apertures traced along the card design. The authentication card can further comprise a fabric cut-out design matching the card design. The stitches can sew the fabric cut-out design into the card design through the apertures using threads. The threads can comprise a natural fiber thread, a synthetic fiber thread, a metal wire thread, or a combination thereof. The stitches can comprise straight stitch, triple stretch stitch, zigzag stitch, triple zigzag stitch, elastic stitch, stretch zigzag stitch, blind hem stitch, stretch blind hem stitch, shell tuck stitch, elastic shell tuck stitch, bland stitch, ladder stitch, elastic overlock stitch, double overlock stitch, double action stitch, slant pin stitch, slant overlock stitch, feather stitch, tree stitch, bridging stitch, fagoting stitch, honeycomb stitch, scallop stitch, buttonhole, and keyhole buttonhole. The one or more layers comprise one or more fabric layers comprising microfiber cloth, spandex, denim, leather, muslin, velvet, flannel, felt, corduroy, cotton, satin, wool, another fabric material, or a combination thereof. The authentication card can further comprise a magnetic stripe, wherein the magnetic stripe is parallel to a widthwise edge or a lengthwise edge of the authentication card.

In some embodiments, a method of producing an authentication card is provided. The method can comprise creating one or more card layers. The method can further comprise sewing stitches through the one or more card layers to provide a stitch-on design. The method can further comprise embedding a chip into the one or more card layers, wherein the chip is coupled with an antenna, to enable contactless transactions by employing radio frequency identification (RFID) or near field communication (NFC).

Creating the one or more card layers can comprise using plastic, metal, fabric, or a combination thereof. Creating the one or more card layers can further comprise creating a first fabric layer, a second fabric layer, and a stiff substrate layer in between. The method can further comprise applying an adhesive to fasten the one or more card layers together. The creating the one or more card layers can further comprise forming a card design with apertures traced along the card design. The method can further comprise generating a fabric cut-out design matching the card design. The sewing can stitch the fabric cut-out design into the card design through the apertures using threads comprising a natural fiber thread, a synthetic fiber thread, a metal wire thread, or a combination thereof. The sewing can comprise stitching a straight stitch, triple stretch stitch, zigzag stitch, triple zigzag stitch, elastic stitch, stretch zigzag stitch, blind hem stitch, stretch blind hem stitch, shell tuck stitch, elastic shell tuck stitch, bland stitch, ladder stitch, elastic overlock stitch, double overlock stitch, double action stitch, slant pin stitch, slant overlock stitch, feather stitch, tree stitch, bridging stitch, fagoting stitch, honeycomb stitch, scallop stitch, buttonhole, and keyhole buttonhole.

In some embodiments, an authentication card apparatus is provided. The authentication card apparatus can comprise a card layer comprising apertures traced along a design shape or gridded over an area of the card layer. The authentication card apparatus can further comprise a microchip, coupled with an antenna, to enable contactless transactions by employing radio frequency identification (RFID) or near field communication (NFC). The authentication card apparatus can further comprise one or more fabric design cut-outs to be sewn into the apertures with threads, wherein in some embodiments a cardholder does the sewing.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

Figure 1:
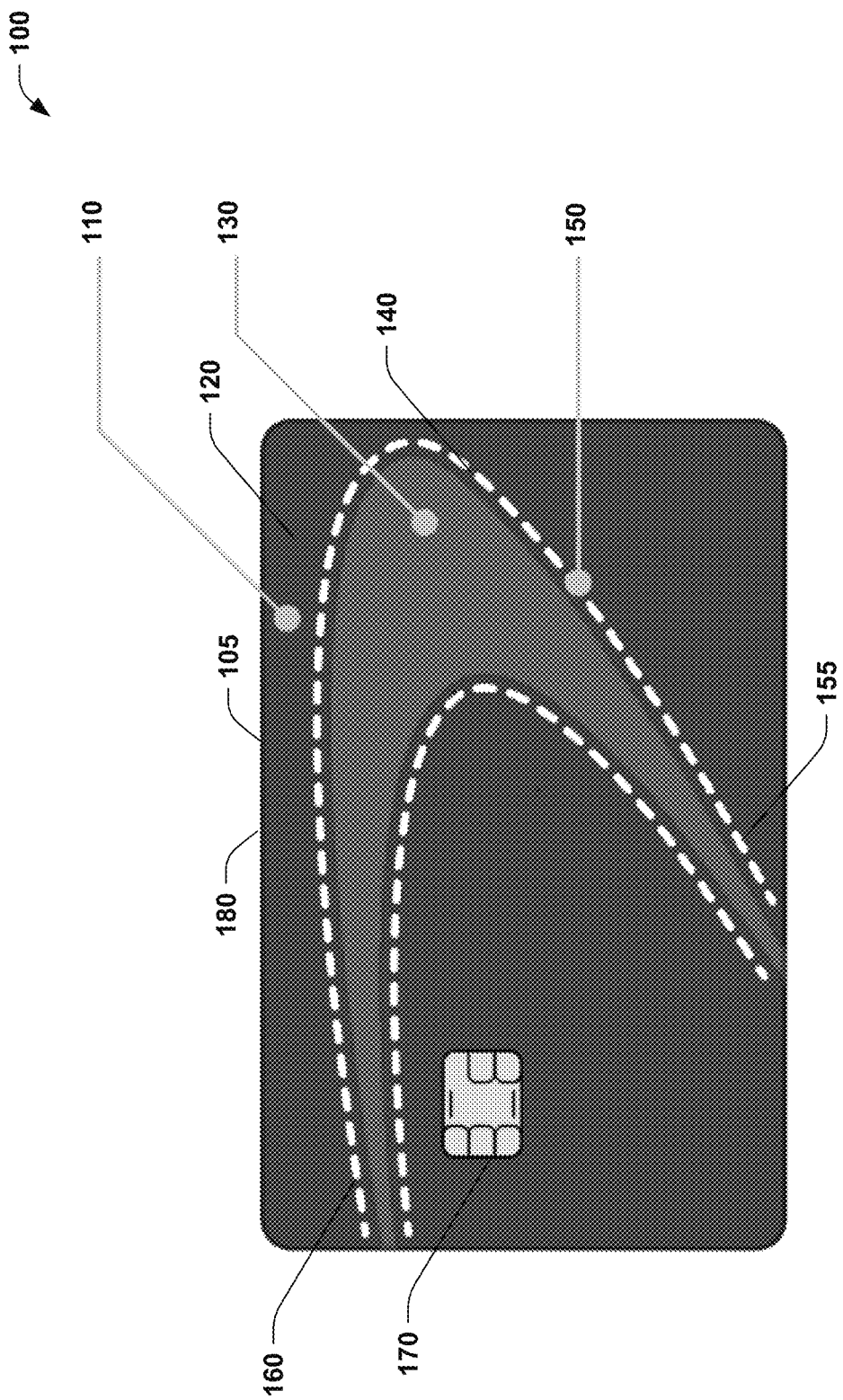
FIG. 1 illustrates an authentication card design in accordance with one or more embodiments described herein.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

For users with visual impairment or for other users in low-light environments, it is often difficult to identify different cards when performing a transaction. With typical cards, a cardholder may have to rely on details such as card number, or a selection of different images printed on an authentication card which wear out quickly with usage. Having different tactile indicators in the form of stitching designs can help visually impaired users quickly differentiate cards.

Furthermore, financial institutions can have incentives to offer unique authentication card designs to stand out from competitors. Most authentication cards are made of polyvinyl chloride acetate (PVCA or PVC) or metal and have a typical feel and look. Having a unique authentication card that can make a fashion statement can give a financial institution an advantage over its competitors, especially if the cardholders can customize or even design their cards.

In some embodiments, an authentication card may be a card configured to perform authentication. For example, an authentication card may be a transaction card, which may be used to perform transactions (e.g., contactless transactions) between users and entities. In one example, the authentication card could be a credit card configured to allow credit card transactions.

Additionally or alternatively, the authentication card may be a physical card including a means for short-range communication. For example, a user may hold their authentication card to a reader (e.g., contactless reader). The contactless reader may securely receive card information, such as via radio frequency identification (RFID) or near field communication (NFC) protocols. The card information may then be used to securely authenticate the user and/or card. The merchant's point-of-sale system may then transmit the transaction to the card issuer, which may analyze the transaction and subsequently approve and/or deny the transaction.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

Referring initially to FIG. 1, an authentication card design 100 is illustrated in accordance with one or more embodiments described herein. An authentication card 105 can have an authentication card body 110, card layers 120, integrated material 130, card design 140, stitching 150, thread 155, apertures 160, microchip 170, and edge 180. The microchip 170, or simply a chip, can be coupled with an antenna to enable contactless transactions by employing radio frequency identification (RFID) or near field communication (NFC).

The card layers 120 can comprise one or more card layers. The card layers 120 can comprise plastic, metal, fabric, or a combination thereof. The plastic can be, but is not limited to, polyvinyl chloride acetate, commonly known as PVCA or PVC. The metal can be, but is not limited to, brass, stainless steel, titanium, gold, palladium, or a combination thereof. The fabric can be, but is not limited to, microfiber cloth, spandex, denim, leather, muslin, velvet, flannel, felt, corduroy, cotton, satin, wool, or a combination thereof. Therefore, the card layers 120 can comprise one or more fabric layers comprising microfiber cloth, spandex, denim, leather, muslin, velvet, flannel, felt, corduroy, cotton, satin, wool, another fabric material, or a combination thereof.

The stitching 150 can be stitches sewn through the card layers 120 to provide a card design 140, e.g., a stitching design. The stitching 150 can also fasten the card layers 120. Additionally, or alternatively, an adhesive can be used to fasten the card layers 120 together. In other embodiments, the stitching 150 can be a faux stitch embossed above the surface of the authentication card 105. The raised faux stitch can be comprised of different color patterns to provide a stitching appearance.

The card layers 120 can comprise card design 140 with the apertures 160 traced along the card design 140. The integrated material 130 can be a fabric cut-out design matching the card design 140. The integrated material 130 can be sewn into the card design 140 through the apertures 160 by the stitching 150 using the thread 155. The thread 155 can comprise a natural fiber thread, a synthetic fiber thread, a metal wire thread, or a combination thereof. According to some examples, the apertures may be provided at an angle, and/or may be substantially perpendicular to a card face.

The integrated material 130 can be made of a type of fabric or a combination of different fabric materials sewn together or attached by other means. The integrated material 130 can be fastened into the authentication card 105 over the card layers 120 or inserted between the card layers 120. The integrated material 130 can be sewn over the card layers 120 through the apertures 160. In this case, the integrated material can have a cut design matching the contour outline made by the apertures 160.

The authentication card can also have a first card layer and a second card layer wherein the integrated material 130 is inserted between the first card layer and the second card layer. The first or second card layer can have a cut design matching the contour outline made by the apertures 160 so that the integrated material 130 can show through the cut-out in the first or second card layer. In this case, because the integrated material 130 can be shown through the cut-out in the first card layer or the second card layer, the integrated material 130 can have a cut design matching the contour outline made by the apertures 160 or the integrated material 130 can extend out towards the edge 180 of the authentication card 105. The integrated material 130 can be fastened by the stitching 150, wherein the thread 155 can be sewn through the apertures 160. The integrated material 130 in the authentication card design 100 can be seen as shown through and extending to the edge 180 of the card layers 120. For structural support, the second card layer on the backside can be either a solid card layer without any design cut-outs or a different design cut-out.

According to some examples, the stitching design created by the stitches may be configured to be used to identify an associated entity. For example, a user and/or a system (e.g., via one or more imaging devices) may be configured to identify the entity associated with a specific stitching design. For example, a system may include a database of different stitching designs and/or card-designs including textiles used, stitching designs, threads used, etc. and use the database to identify an associated user/entity.

According to some examples, one or more apertures may be provided on an indented portion on the surface of at least one card layer. For example, the one or more apertures may be provided in an indented channel or groove on the surface of a card layer. A thread may be inserted through the apertures provided on the indented portion such that the stitching pattern or at least a part of the stitching pattern is also provided within the indented portion. By doing so, the thread may sit flush with the surface of the card layer when inserted through the apertures to create a stitching design or part thereof. A card layer having an indented portion may be a top card layer (e.g., attached above all other card layers of a card) such that the stitching sits in the indented portion (e.g., groove, channel). In other examples, a card layer having an indented portion my be a bottom layer or a middle layer, such that the surface containing the indented portion is attached to a surface of other card layers. According to some embodiments, apertures may be provided on a surface of the card layer, where the apertures are connected via a channel provided within the card layer, rather than on the surface of the card layer. When inserted through the apertures, the thread may sit within the channel and within the card layer.

In some examples, the indented portion may be provided on a portion of the card layer where the microchip is provided, or where a magnetic stripe is provided such that the card is of a standard thickness in that portion of the card and can be input into a Point of Sale (POS) system when a user makes purchases.

In some examples, a portion of the card and/or portions of card layers containing, above, or below a magnetic stripe or microchip may not have apertures provided upon them. For example, the apertures may be provided on different portions such that a stitching design does not interfere with insertion of the card through a POS system.

Figure 2:
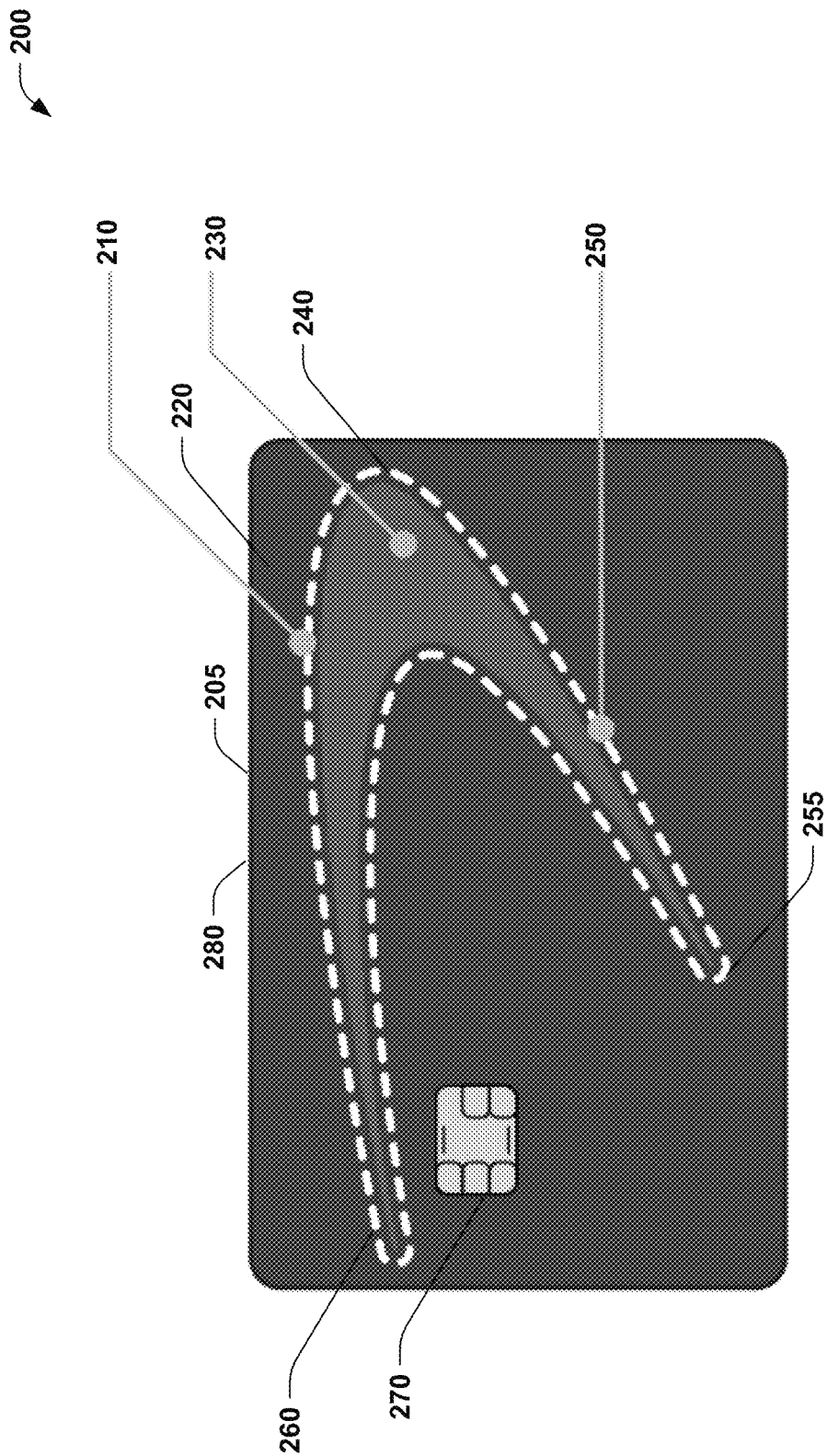
FIG. 2 illustrates an authentication card design in accordance with one or more embodiments described herein.

FIG. 2 illustrates an authentication card design 200 in accordance with one or more embodiments described herein. Authentication card 205 can have an authentication card body 210, card layers 220, integrated material 230, card design 240, stitching 250, thread 255, apertures 260, microchip 270, and edge 280.

The authentication card 205 can have similar features as the authentication card 105. For the sake of brevity, those similar features having similar names are not described again here. Unlike the authentication card 105, the integrated material 230 and the card design 240 can be seen as not extending to the edge 280. Therefore, a second card layer on the backside of the authentication card 205 can have the same design cut-out, and it can also have a different design cut-out or no design cut-outs.

Figure 3:
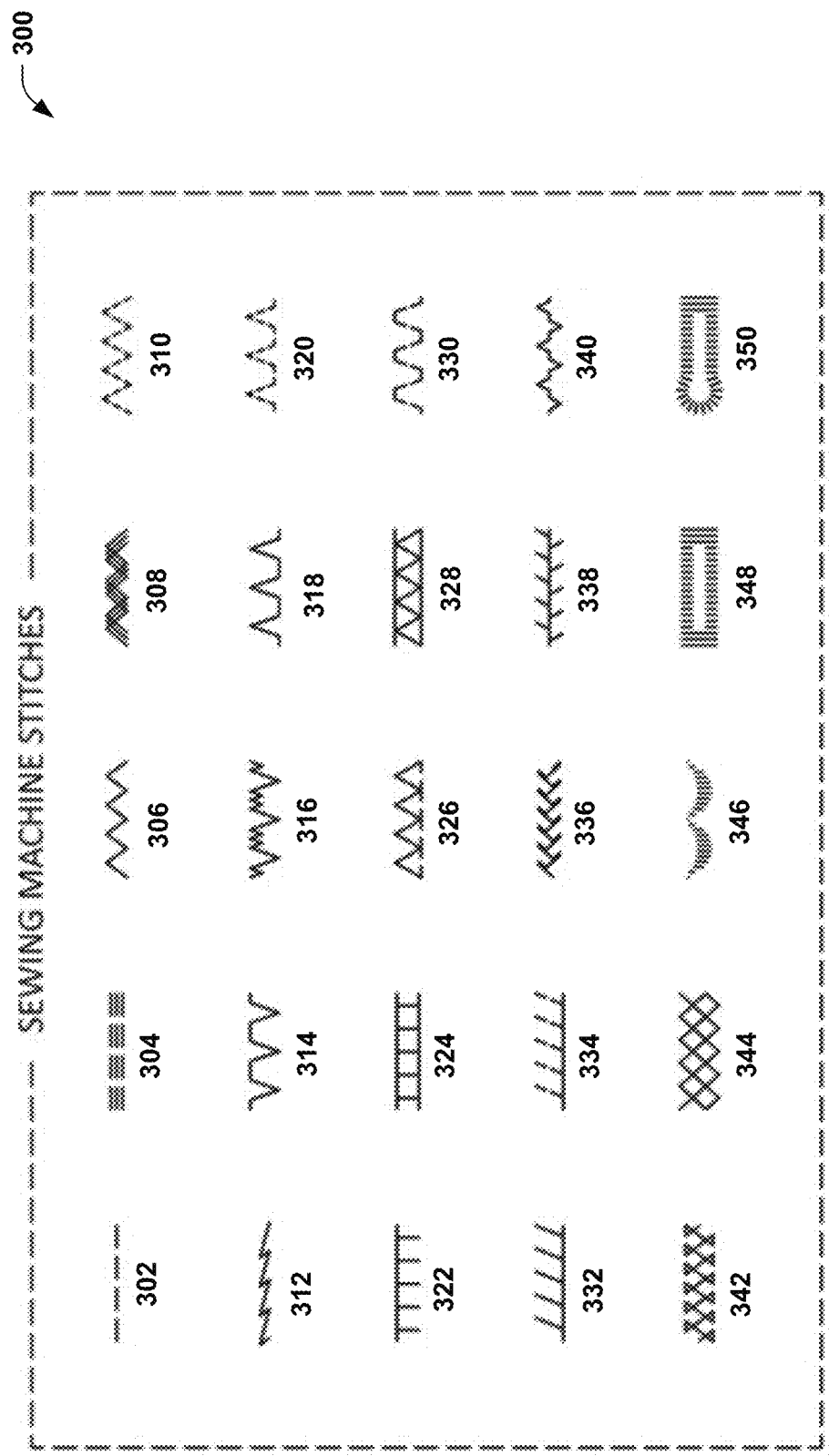
FIG. 3 illustrates sewing machine stitches in accordance with one or more embodiments described herein.

FIG. 3 illustrates sewing machine stitches 300 in accordance with one or more embodiments described herein. The sewing machine stitches 300 can comprise different types of stitches for stitching. The stitches can comprise straight stitch 302, triple stretch stitch 304, zigzag stitch 306, triple zigzag stitch 308, elastic stitch 310, stretch zigzag stitch 312, blind hem stitch 314, stretch blind hem stitch 316, shell tuck stitch 318, elastic shell tuck stitch 320, bland stitch 322, ladder stitch 324, elastic overlock stitch 326, double overlock stitch 328, double action stitch 330, slant pin stitch 332, slant overlock stitch 334, feather stitch 336, tree stitch 338, bridging stitch 340, fagoting stitch 342, honeycomb stitch 344, scallop stitch 346, buttonhole 348, and keyhole buttonhole 350. Stitching may be performed by inserting a thread into one or more apertures of a plurality of apertures provided on a card layer.

Figure 4:
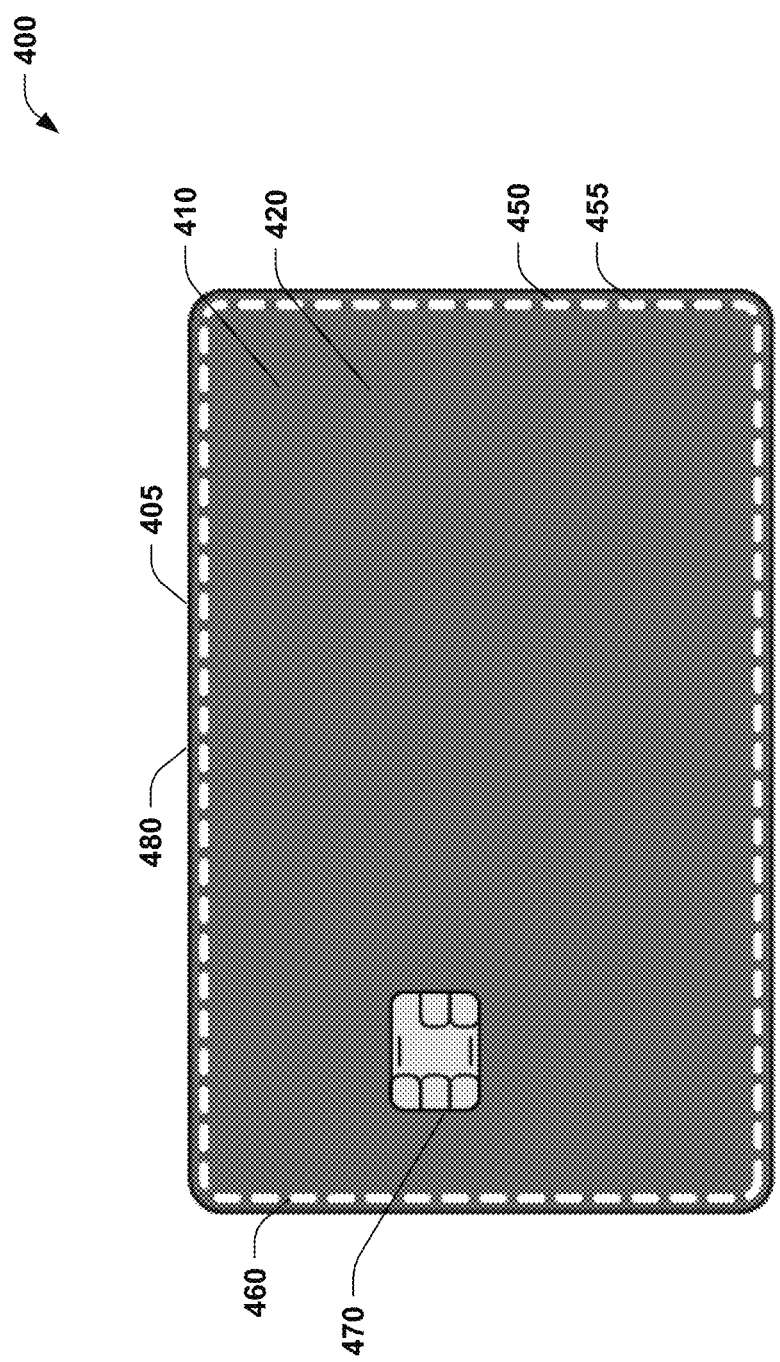
FIG. 4 illustrates an authentication card design in accordance with one or more embodiments described herein.
Figure 5:
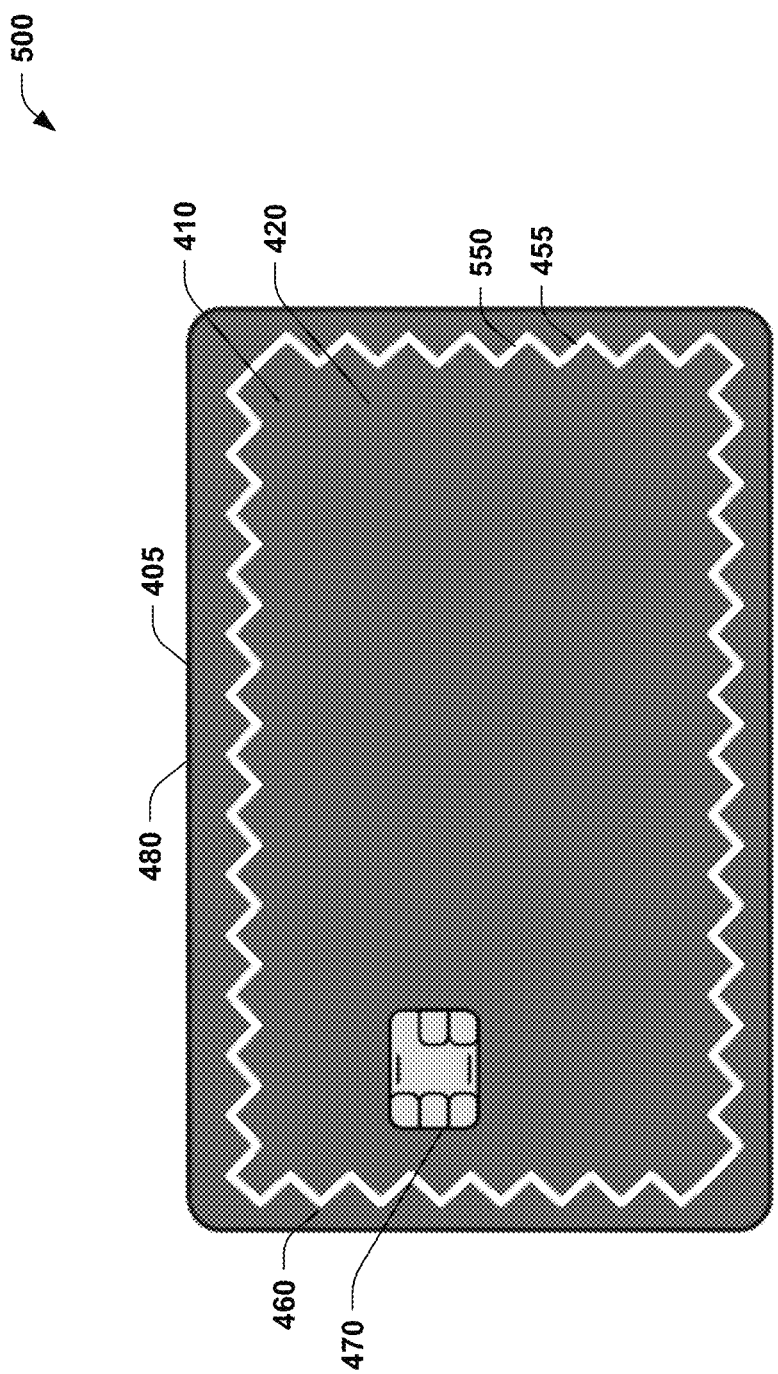
FIG. 5 illustrates an authentication card design in accordance with one or more embodiments described herein.
Figure 6:
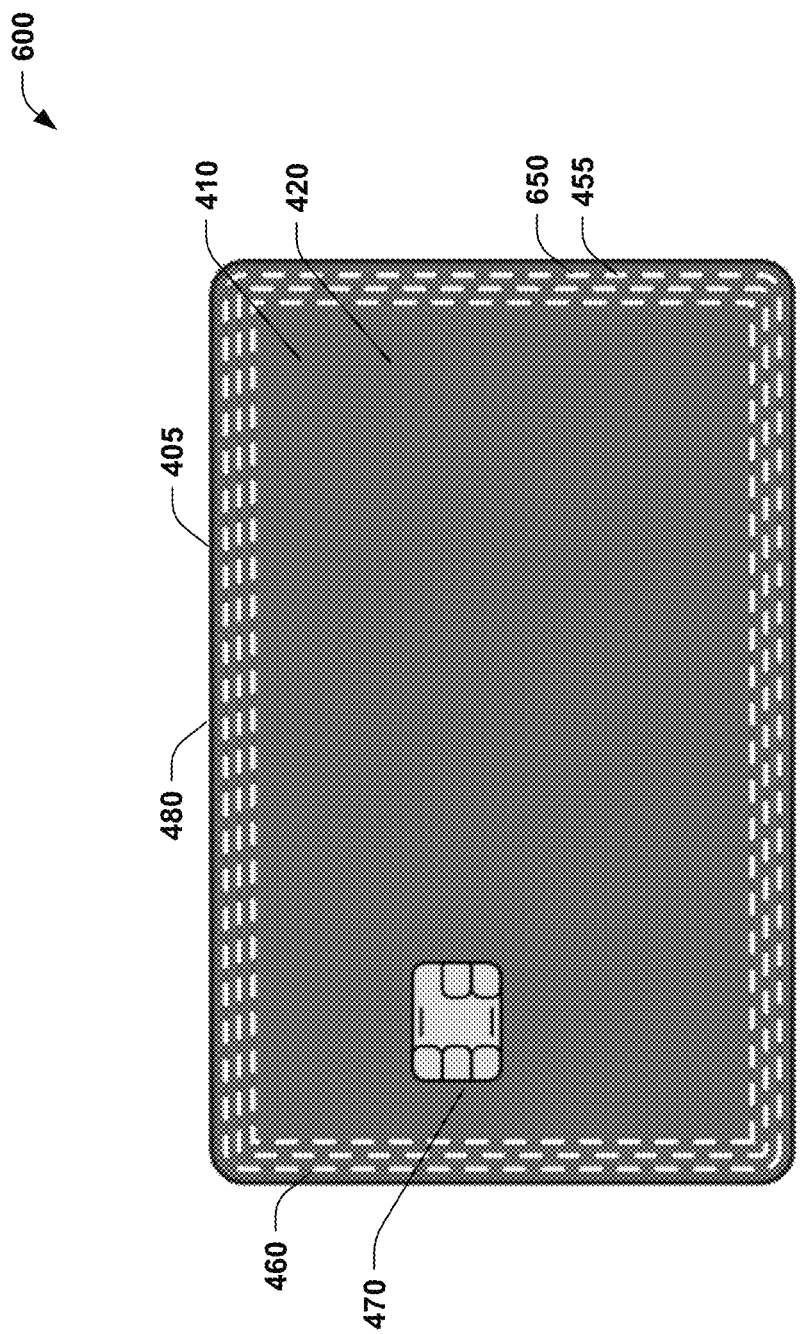
FIG. 6 illustrates an authentication card design in accordance with one or more embodiments described herein.
Figure 7:
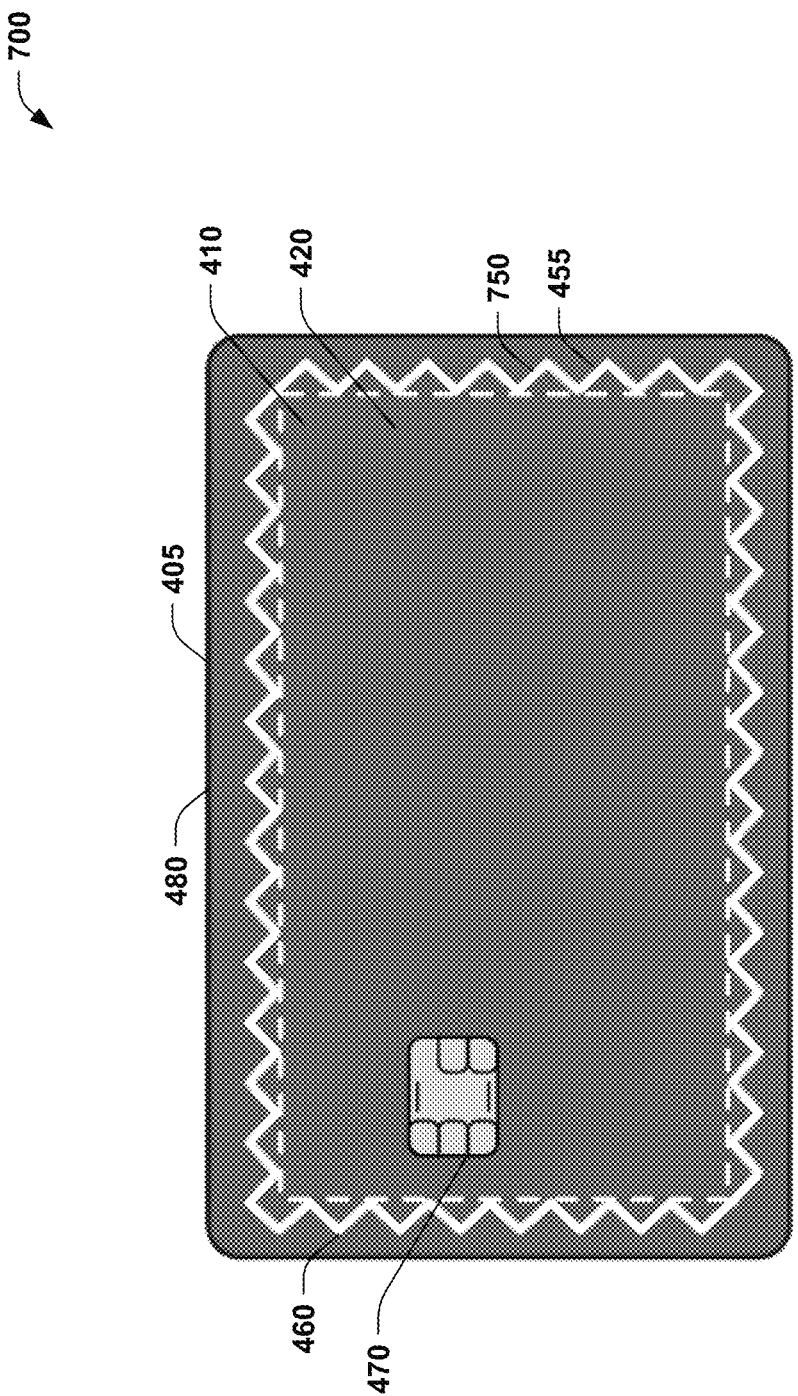
FIG. 7 illustrates an authentication card design in accordance with one or more embodiments described herein.
Figure 8:
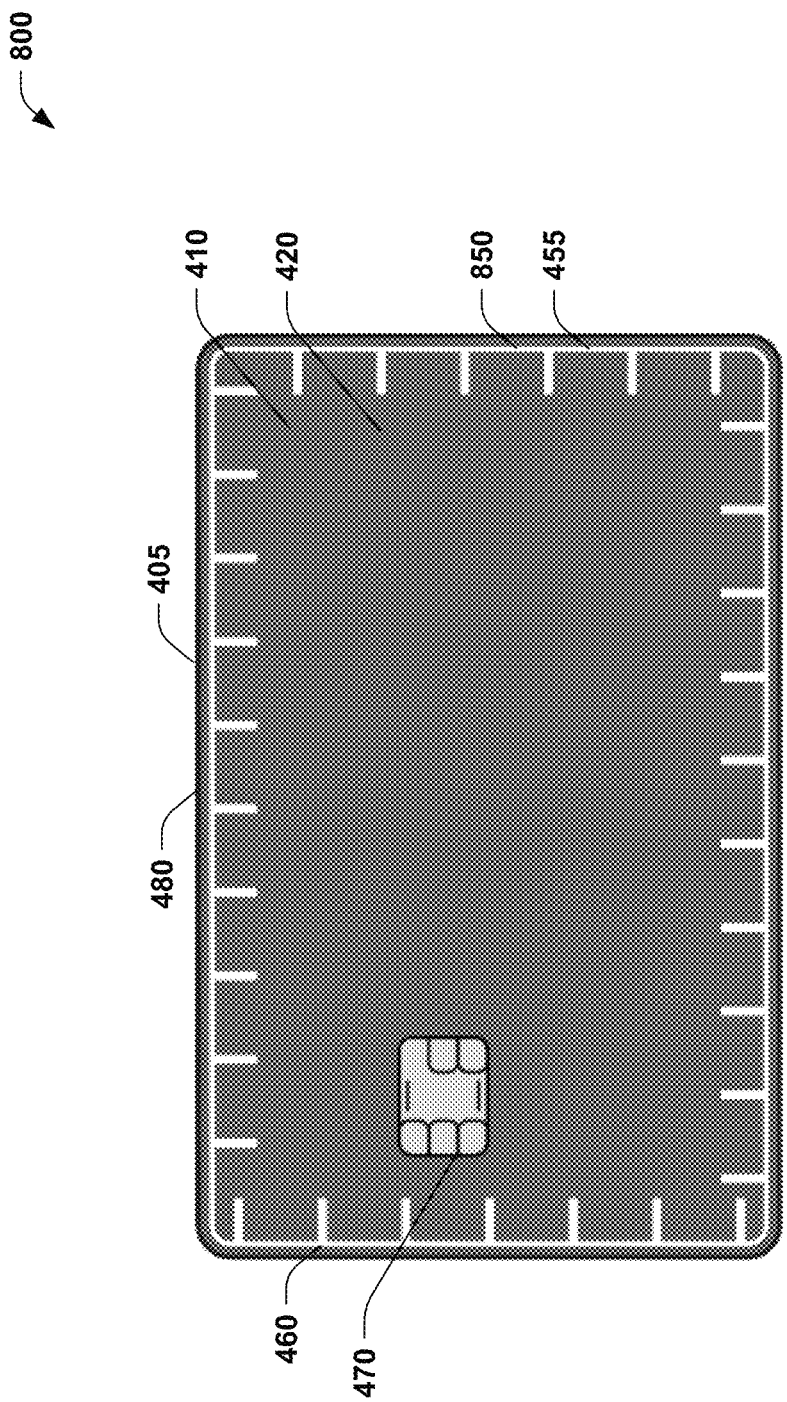
FIG. 8 illustrates an authentication card design in accordance with one or more embodiments described herein.
Figure 9:
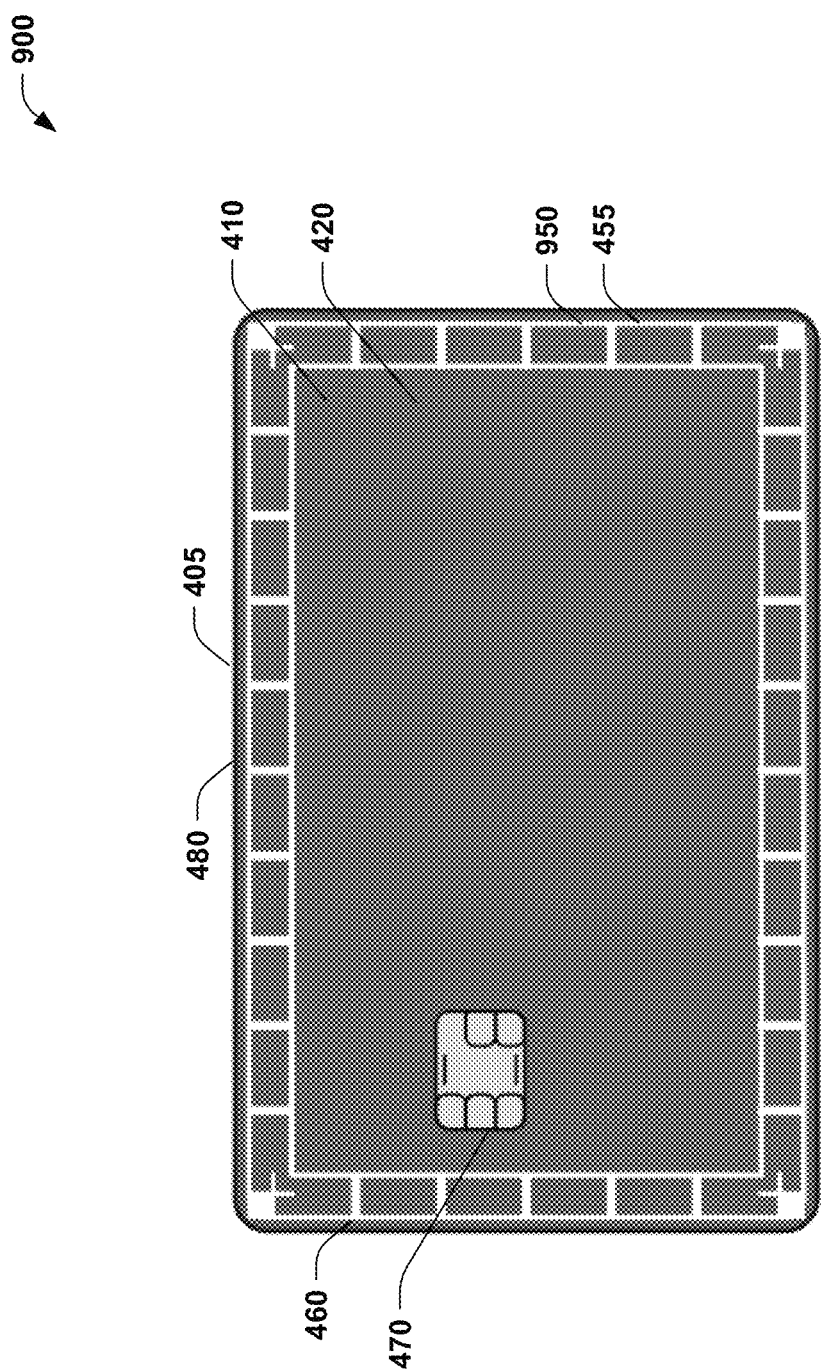
FIG. 9 illustrates an authentication card design in accordance with one or more embodiments described herein.

FIG. 4 illustrates an authentication card design 400 in accordance with one or more embodiments described herein. Authentication card 405 can have an authentication card body 410, card layers 420, stitching 450, thread 455, apertures 460, microchip 470, and edge 480.

The authentication card 405 can have similar features as the authentication card 105 and the authentication card 205. For the sake of brevity, those similar features having similar names are not described again here. Unlike the authentication card 105 and the authentication card 205, the authentication card 405 does not have a design cut-out. The stitching 450 can have the stitching 450 sewn along the perimeter of the authentication card 405. The stitching 450 can be straight stitch 302.

FIGS. 5-9 illustrate authentication card design 500-900 in accordance with one or more embodiments described herein. The authentication card design 500-900 can comprise authentication card 405, authentication card body 410, card layers 420, thread 455, apertures 460, microchip 470, and edge 480. The microchip 470, or simply a chip, can be coupled with an antenna to enable contactless transactions by employing radio frequency identification (RFID) or near field communication (NFC).

The authentication card design 500-900 can have different stitching patterns as the featured design. For the authentication card design 500-900, the stitching 450 can be zigzag stitch 306, triple stretch stitch 304, elastic overlock stitch 326, bland stitch 322, or ladder stitch 324, respectively.

Figure 10:
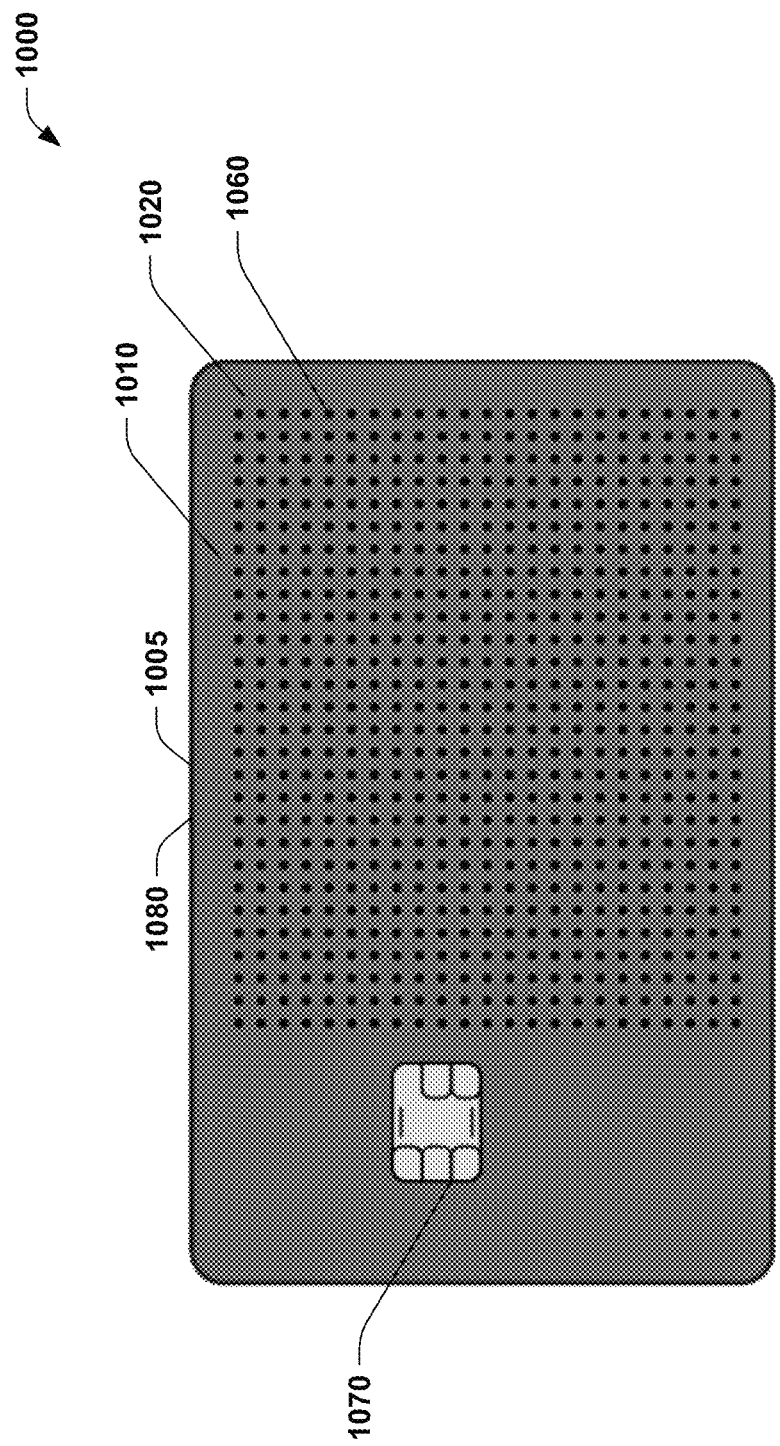
FIG. 10 illustrates an authentication card design in accordance with one or more embodiments described herein.

FIG. 10 illustrates an authentication card design 1000 in accordance with one or more embodiments described herein. The authentication card design 1000 can comprise authentication card 1005, authentication card body 1010, card layers 1020, apertures 1060, microchip 1070, and edge 1080. For the sake of brevity, these similar features are not described again here.

The authentication card 1005 can comprise card layers 1020 that can have the apertures 1060 traced along a shape of a design or gridded over an area of the card layers 1020 as shown in FIG. 10. In this example embodiment, one or more fabric design cut-outs can be sewn into the apertures with threads, wherein a cardholder can do the sewing. This can allow the cardholder to switch designs without requesting a new authentication card.

Figure 11:
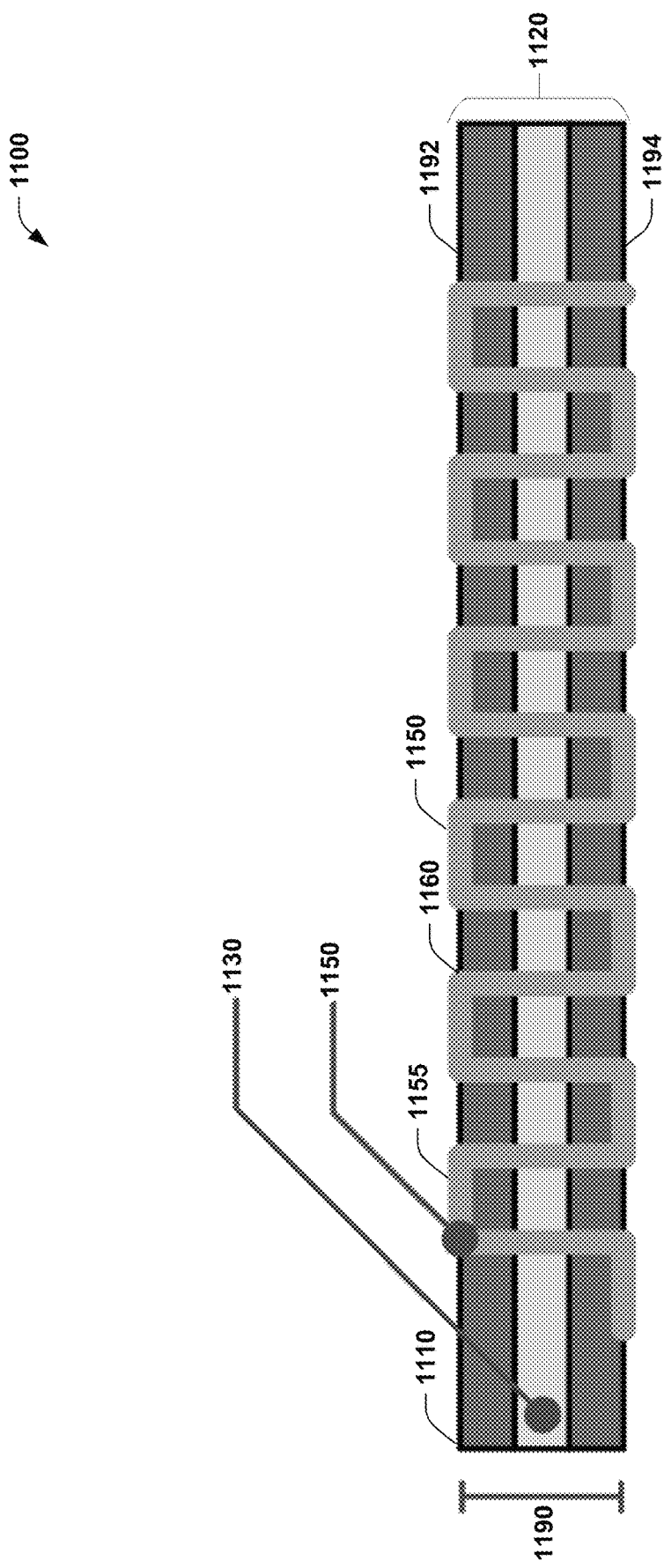
FIG. 11 illustrates a cross-section of an authentication card in accordance with one or more embodiments described herein.

FIG. 11 illustrates a cross-section 1100 of an authentication card in accordance with one or more embodiments described herein. The cross-section of an authentication card can comprise an authentication card body 1110, card layers 1120, integrated material 1130, stitching 1150, thread 1155, apertures 1160, a first card layer 1192, a second card layer 1194, and a thickness 1190. For the sake of brevity, similarly named features are not described again here.

As illustrated here, the thread 1155 can be sewn through the card layers 1120, which includes the first card layer 1192, the second card layer 1194, and the integrated material 1130 inserted in between. However, it is appreciated that the thread 1155 can also be sewn through select sub-layers and not all the layers because another form of fastening can be used, such as but not limited to an adhesive.

In some embodiments, the first card layer 1192 and the second card layer 1194 can be made of plastic or metal, and the integrated material 1130 can be made of fabric. The integrated material 1130 can be shown through cut-outs in the first card layer 1192 or the second card layer 1194.

In other embodiments, the first card layer 1192 and the second card layer 1194 can be made of fabric, and the integrated material 1130 can be made of plastic or metal. In these embodiments, the integrated material 1130 can be used as a stiff substrate to provide structural support for the first card layer 1192 and the second card layer 1194 to give the appearance of an all-fabric authentication card, other than embedded items such as a microchip. It is appreciated that an authentication card can be made of fabric on one side and either plastic or metal on the other side.

An authentication card can have the thickness 1190, measuring the front surface of an authentication card to the back surface of an authentication card. The thickness 1190 can be a standard thickness needed for most authentication cards so that a microchip on the authentication card can be inserted into a chip reader.

Figure 12:
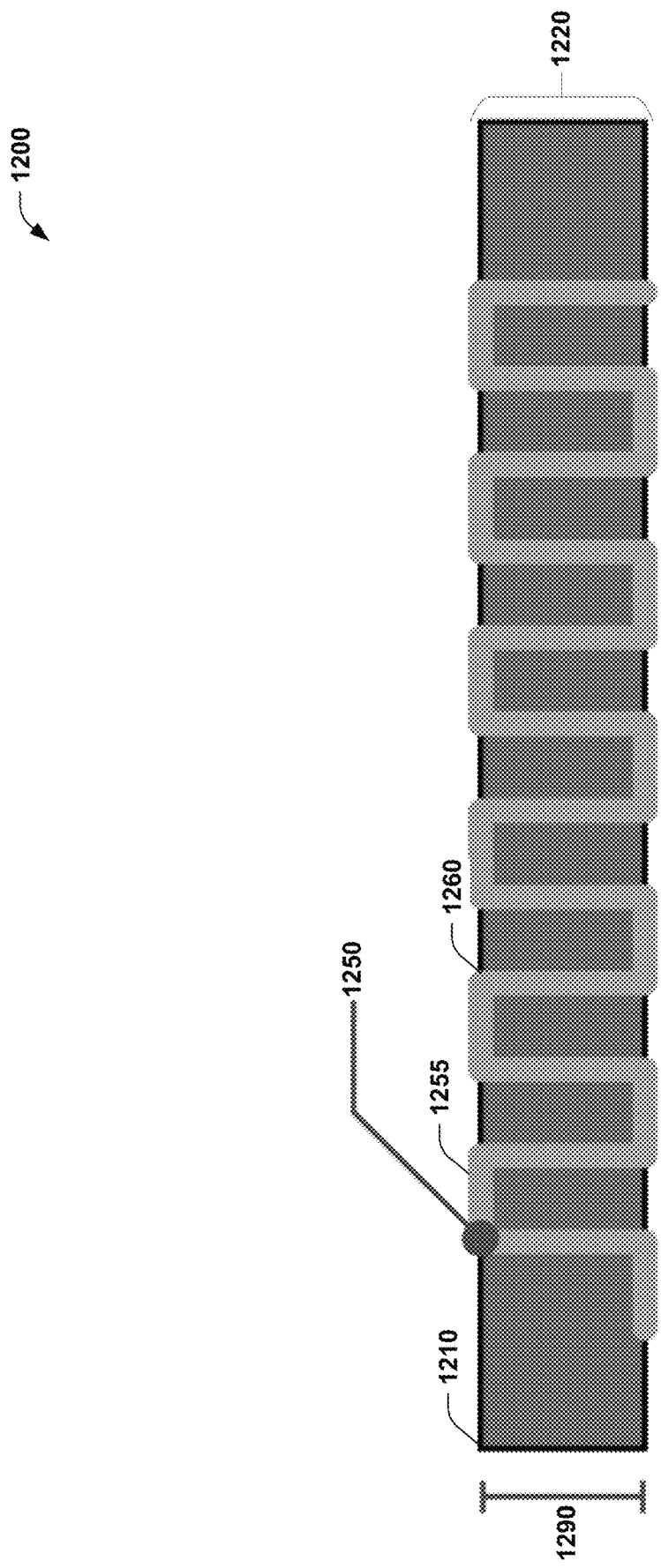
FIG. 12 illustrates a cross-section of an authentication card in accordance with one or more embodiments described herein.

FIG. 12 illustrates a cross-section 1200 of an authentication card in accordance with one or more embodiments described herein. The cross-section 1200 of an authentication card can comprise an authentication card body 1210, card layers 1220, stitching 1250, thread 1255, apertures 1260, and a thickness 1290. For the sake of brevity, similarly named features are not described again here. As illustrated here in FIG. 12, the card layers 1220 can be a uniform layer without an integrated material. For example, the card layers 1220 can be made of all plastic or all metal. The stitching 1250 can provide a stitched design without actually stitching a fabric layer into an authentication card.

Figure 13:
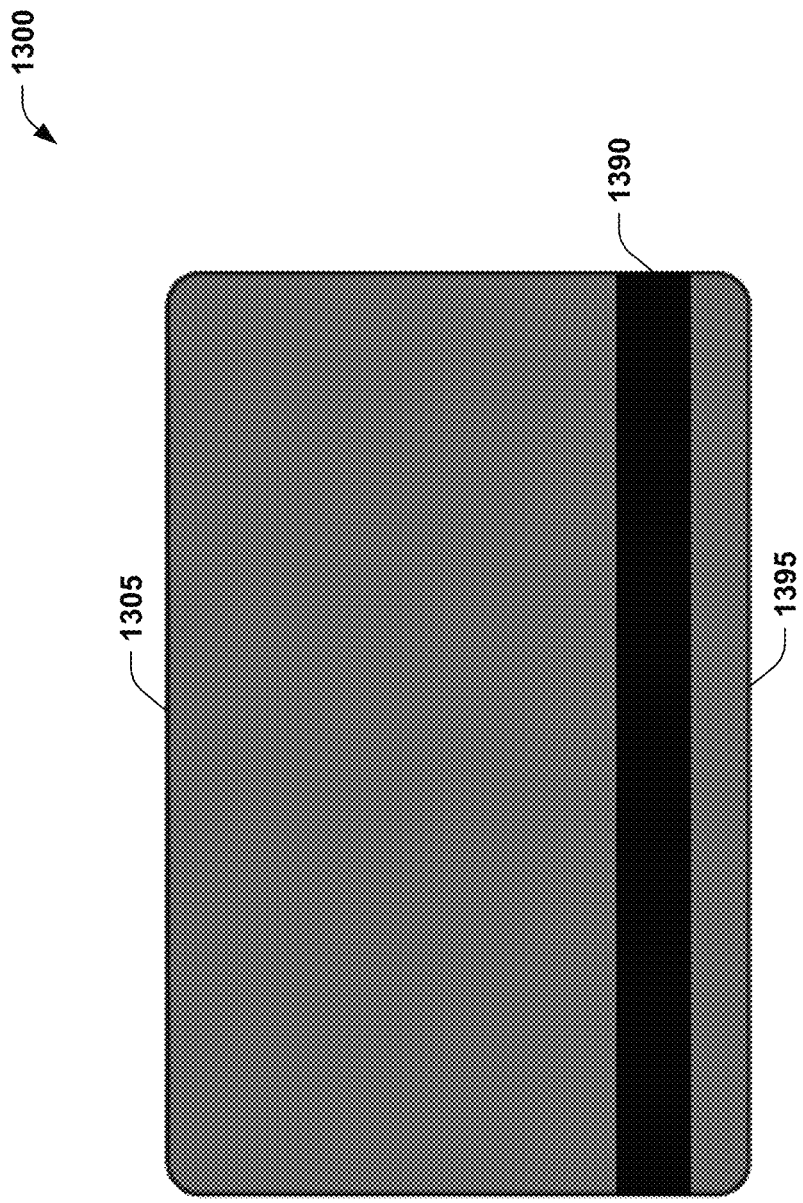
FIG. 13 illustrates a magnetic stripe position in accordance with one or more embodiments described herein.

FIG. 13 illustrates magnetic stripe position 1300 in accordance with one or more embodiments described herein. The authentication card 1305 can comprise magnetic stripe 1390, wherein the magnetic stripe 1390 is parallel to a lengthwise edge 1395 of the authentication card 1305. It is appreciated that having a magnetic stripe can be optional.

Figure 14:
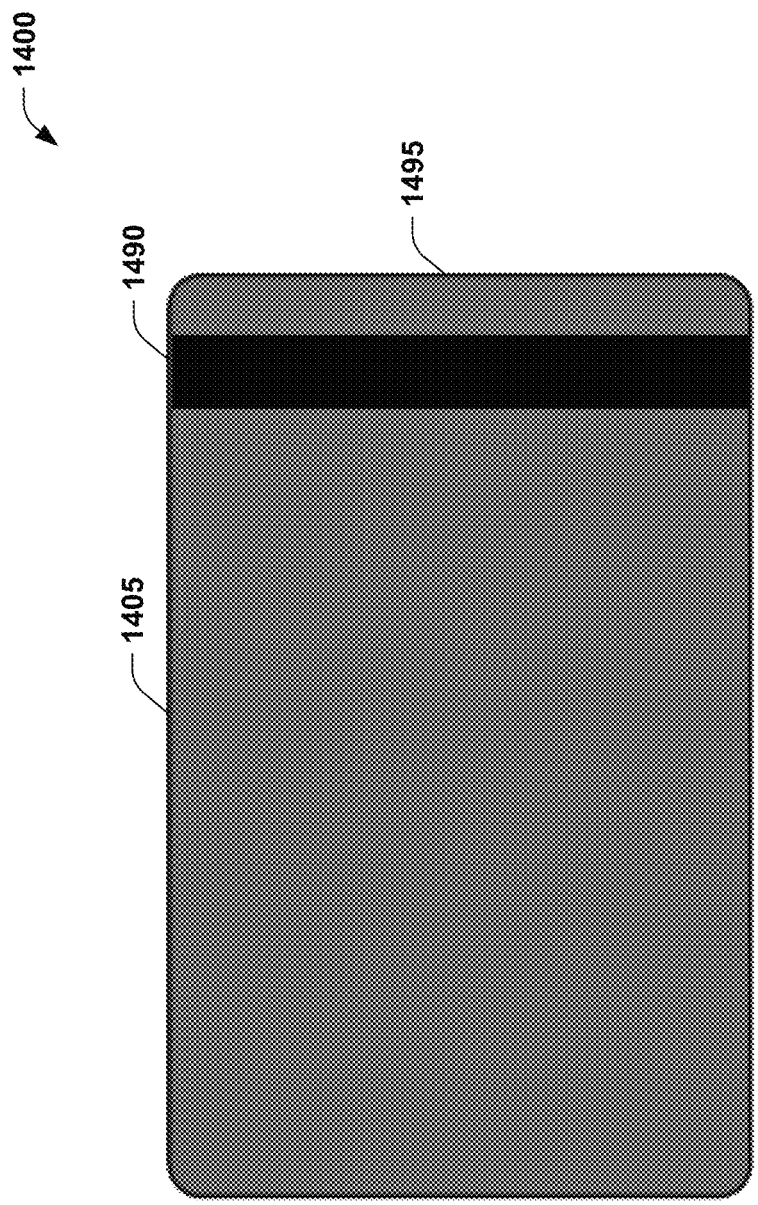
FIG. 14 illustrates a magnetic stripe position in accordance with one or more embodiments described herein.

FIG. 14 illustrates magnetic stripe position 1400 in accordance with one or more embodiments described herein. The authentication card 1405 can comprise magnetic stripe 1490, wherein the magnetic stripe 1490 is parallel to a widthwise edge 1495 of the authentication card 1405. It is appreciated that the position of a magnetic stripe can be based on the design of an authentication card. Locating a magnetic stripe on a widthwise edge of an authentication card can provide a greater surface area to add designs, although including a magnetic stripe can be optional. It is appreciated that a shorter magnetic stripe does not affect its function.

Figure 15:
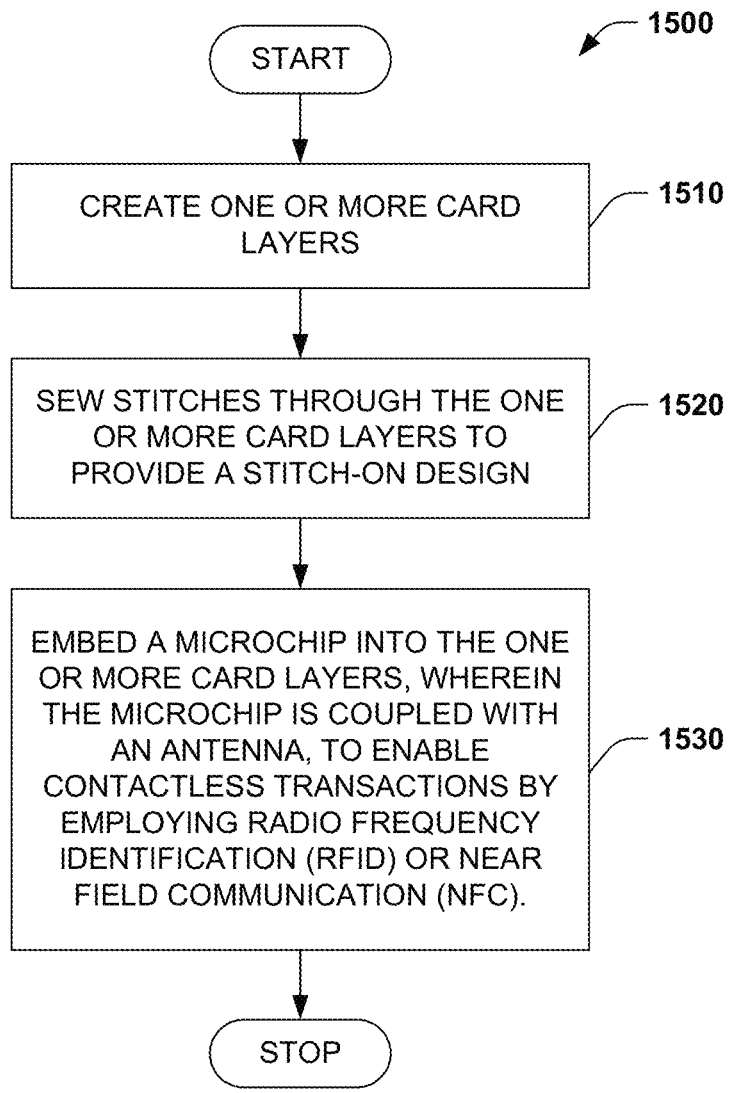
FIG. 15 is a flow chart diagram of a method of producing an authentication card in accordance with one or more embodiments described herein.

FIG. 15 is a flow chart diagram of a method 1500 of producing an authentication card in accordance with one or more embodiments described herein. In some embodiments, the method 1500 may be used to produce an authentication card for short-range wireless communications with entity-specific stitching designs. For example, an entity may be a cardholder, or a company, or a group of users.

At 1510, the method 1500 of producing an authentication card can comprise creating one or more card layers. Act 1510 of method 1500 for producing an authentication card can include creating the one or more card layers using plastic, metal, fabric, or a combination thereof. The method 1500 of producing an authentication card can comprise creating a first fabric layer, a second fabric layer, and a stiff substrate layer in between.

In some embodiments, at 1510, the method 1500 of producing an authentication card can comprise providing at least one card layer comprising a first portion and a second portion. For example, providing the at least one card layer may include creating the layer via weaving cloth, extruding plastics, and/or the like. In some examples, providing the at least one card layer may not involve the actual creation of the material of the at least one card layer, but supplying or making available the at least one card layer for use. The method 1500 of producing an authentication card can further comprise applying an adhesive to fasten the one or more card layers together.

At 1510, the method may also include creating the one or more card layers including forming a card design with apertures traced along the card design. For example, in some embodiments, the method 1500 may include providing a plurality of apertures on a first portion of the at least one card layer.

The method 1500 of producing an authentication card can further comprise generating a fabric cut-out design matching the card design. The method 1500 of producing an authentication card can further comprise sewing stitches of the fabric cut-out design into the card design through the apertures using threads comprising of a natural fiber thread, a synthetic fiber thread, a metal wire thread, or a combination thereof.

The method 1500 for producing an authentication card can further comprise sewing at 1520. At 1520, the method 1500 of producing an authentication card can further comprise sewing stitches through the one or more card layers to provide a stitch-on design. For example, a thread may be inserted through the plurality of apertures to create a stitching design, wherein the stitching design is configured to be used to identify an associated entity.

Sewing may comprise stitching straight stitch, triple stretch stitch, zigzag stitch, triple zigzag stitch, elastic stitch, stretch zigzag stitch, blind hem stitch, stretch blind hem stitch, shell tuck stitch, elastic shell tuck stitch, bland stitch, ladder stitch, elastic overlock stitch, double overlock stitch, double action stitch, slant pin stitch, slant overlock stitch, feather stitch, tree stitch, bridging stitch, fagoting stitch, honeycomb stitch, scallop stitch, buttonhole, and keyhole buttonhole. The method 1500 of producing an authentication card can further comprise embedding a magnetic stripe, wherein the magnetic stripe is parallel to a widthwise edge or a lengthwise edge of the authentication card.

At 1530, the method 1500 of producing an authentication card can further comprise embedding a microchip into the one or more card layers, wherein the microchip is coupled with an antenna, to enable contactless transactions by employing radio frequency identification (RFID) or near field communication (NFC).

In some examples, the microchip may be embedded into a portion separate from a portion on the one or more card layers having apertures. For example, the microchip may be embedded on a first side of a card layer, and the aperture may be provided on a different side of the card layer. In some examples, the microchip may be provided a first half of the card layer, and apertures may be provided on a different half. In some examples, the microchip may be provided in a central position on the card layer, and apertures may be provided around the microchip.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

A1. An authentication card for short range wireless communications with an entity-specific stitching design, the authentication card comprising: at least one card layer comprising a first portion and a second portion; a plurality of apertures provided on the first portion of the at least one card layer; a thread inserted through the plurality of apertures to create a stitching design, wherein the stitching design is configured to be used to identify an associated entity; and a microchip provided on the second portion of the at least one card layer, wherein the microchip is coupled with an antenna enabling contactless transactions by employing radio frequency identification (RFID) or near field communication (NFC).

A2. The authentication card of any one of the preceding embodiments, wherein the at least one card layer comprises plastic, metal, fabric, or a combination thereof.

A3. The authentication card of any one of the preceding embodiments, wherein the at least one card layer comprises a first fabric layer, a second fabric layer, and a stiff substrate layer between the first fabric layer and the second fabric layer.

A4. The authentication card of any one of the preceding embodiments, further comprising an adhesive to fasten the at least one card layer to another card layer of the authentication card.

A5. The authentication card of any one of the preceding embodiments, wherein the first portion of the at least one card layer comprises a card design, and wherein the plurality of apertures is provided along a perimeter of the card design.

A6. The authentication card of claim 5, further comprising a fabric cut-out design matching the card design.

A7. The authentication card of any one of the preceding embodiments, wherein: the stitching design is configured to attach the fabric cut-out design into the card design through the plurality of apertures using the thread, and the thread comprises a natural fiber thread, a synthetic fiber thread, a metal wire thread, or a combination thereof.

A8. The authentication card of any one of the preceding embodiments, wherein the stitching design comprises one or more stitches including a straight stitch, triple stretch stitch, zigzag stitch, triple zigzag stitch, elastic stitch, stretch zigzag stitch, blind hem stitch, stretch blind hem stitch, shell tuck stitch, elastic shell tuck stitch, bland stitch, ladder stitch, elastic overlock stitch, double overlock stitch, double action stitch, slant pin stitch, slant overlock stitch, feather stitch, tree stitch, bridging stitch, fagoting stitch, honeycomb stitch, scallop stitch, buttonhole, and/or keyhole buttonhole.

A9. The authentication card of any one of the preceding embodiments, wherein the at least one card layer comprises one or more fabric layers comprising microfiber cloth, spandex, denim, leather, muslin, velvet, flannel, felt, corduroy, cotton, satin, wool, another fabric material, or a combination thereof.

A10. The authentication card of any one of the preceding embodiments, further comprising a magnetic stripe, wherein the magnetic stripe is parallel to a widthwise edge or a lengthwise edge of the authentication card.

A11. A method of producing an authentication card of any of the embodiments of 1-11.

A12. An authentication card apparatus, comprising: at least one card layer comprising a plurality of apertures provided on a first portion of the at least one card layer, wherein the plurality of apertures is provided along a shape of a design or gridded over an area of the at least one card layer configured to be used to identify an associated entity; and a microchip provided on a second portion of the at least one card layer, wherein the microchip is coupled with an antenna enabling contactless transactions by employing radio frequency identification (RFID) or near field communication (NFC).

A13. The authentication card apparatus of any one of the preceding embodiments, further comprising a magnetic stripe, wherein the magnetic stripe is parallel to a widthwise edge or a lengthwise edge of the authentication card apparatus.

B1. A transaction card, comprising: one or more card layers; stitches sewn through the one or more card layers to provide a stitching design; and a microchip coupled with an antenna that enables contactless transactions by employing radio frequency identification (RFID) or near field communication (NFC).

B2. The transaction card of any one of the preceding embodiments, wherein the one or more card layers comprise plastic, metal, fabric, or a combination thereof.

B3. The transaction card of any one of the preceding embodiments, wherein the one or more card layers comprises a first fabric layer, a second fabric layer, and a stiff substrate layer between the first fabric layer and the second fabric layer.

B4. The transaction card of any one of the preceding embodiments, further comprising an adhesive to fasten the one or more card layers together.

B5. The transaction card of any one of the preceding embodiments, wherein the one or more card layers comprise a card design with apertures traced along the card design.

B6. The transaction card of any one of the preceding embodiments, further comprising a fabric cut-out design matching the card design.

B7. The transaction card of any one of the preceding embodiments, wherein the stitches sew the fabric cut-out design into the card design through the apertures using threads, and the threads comprise a natural fiber thread, a synthetic fiber thread, a metal wire thread, or a combination thereof.

B8. The transaction card of any one of the preceding embodiments, wherein the stitches comprise straight stitch, triple stretch stitch, zigzag stitch, triple zigzag stitch, elastic stitch, stretch zigzag stitch, blind hem stitch, stretch blind hem stitch, shell tuck stitch, elastic shell tuck stitch, bland stitch, ladder stitch, elastic overlock stitch, double overlock stitch, double action stitch, slant pin stitch, slant overlock stitch, feather stitch, tree stitch, bridging stitch, fagoting stitch, honeycomb stitch, scallop stitch, buttonhole, and/or keyhole buttonhole.

B9. The transaction card of claim 1, wherein the one or more layers comprise one or more fabric layers comprising microfiber cloth, spandex, denim, leather, muslin, velvet, flannel, felt, corduroy, cotton, satin, wool, another fabric material, or a combination thereof.

B10. The transaction card of any one of the preceding embodiments, further comprising a magnetic stripe, wherein the magnetic stripe is parallel to a widthwise edge or a lengthwise edge of the transaction card.

B11. A method of producing an authentication card of any of the embodiments of 1-11.

B12. A payment card apparatus, comprising: one more card layers comprising apertures traced along a shape of a design or gridded over an area of the card layer; and a microchip coupled with an antenna that enables contactless transactions by employing radio frequency identification (RFID) or near field communication (NFC).

B13. The payment card apparatus of any of the preceding embodiments, further comprising one or more fabric design cut-outs to be sewn into the apertures with threads, wherein a cardholder does the sewing.

What is claimed is:

1. An authentication card for short range wireless communications with an entity-specific stitching design, the authentication card comprising:
   at least one card layer comprising a first portion and a second portion, wherein the first portion of the at least one card layer comprises a card design;
   a plurality of apertures provided on the first portion of the at least one card layer, wherein the plurality of apertures is provided along a perimeter of the card design;
   a thread inserted through the plurality of apertures to create a stitching design, wherein the stitching design is configured to be used to identify an associated entity; and
   a microchip provided on the second portion of the at least one card layer, wherein the microchip is coupled with an antenna enabling contactless authentication by employing radio frequency identification (RFID) or near field communication (NFC).

2. The authentication card of claim 1, wherein the at least one card layer comprises plastic, metal, fabric, or a combination thereof.

3. The authentication card of claim 1, wherein the at least one card layer comprises a first fabric layer, a second fabric layer, and a stiff substrate layer between the first fabric layer and the second fabric layer.

4. The authentication card of claim 3, further comprising an adhesive to fasten the at least one card layer to another card layer of the authentication card.

5. The authentication card of claim 1, further comprising a fabric cut-out design matching the card design.

6. The authentication card of claim 5, wherein:
   the stitching design is configured to attach the fabric cut-out design into the card design through the plurality of apertures using the thread, and
   the thread comprises a natural fiber thread, a synthetic fiber thread, a metal wire thread, or a combination thereof.

7. The authentication card of claim 1, wherein the stitching design comprises one or more stitches including a straight stitch, triple stretch stitch, zigzag stitch, triple zigzag stitch, elastic stitch, stretch zigzag stitch, blind hem stitch, stretch blind hem stitch, shell tuck stitch, elastic shell tuck stitch, bland stitch, ladder stitch, elastic overlock stitch, double overlock stitch, double action stitch, slant pin stitch, slant overlock stitch, feather stitch, tree stitch, bridging stitch, fagoting stitch, honeycomb stitch, scallop stitch, buttonhole, and/or keyhole buttonhole.

8. The authentication card of claim 1, wherein the at least one card layer comprises one or more fabric layers comprising microfiber cloth, spandex, denim, leather, muslin, velvet, flannel, felt, corduroy, cotton, satin, wool, another fabric material, or a combination thereof.

9. The authentication card of claim 8, further comprising a magnetic stripe, wherein the magnetic stripe is parallel to a widthwise edge or a lengthwise edge of the authentication card.

10. A method of producing an authentication card comprising:
    providing at least one card layer comprising a first portion and a second portion, wherein the first portion of the at least one card layer comprises a card design;
    providing a plurality of apertures provided on the first portion of the at least one card layer, wherein the plurality of apertures is provided along a perimeter of the card design;
    inserting a thread through the plurality of apertures to create a stitching design, wherein the stitching design is configured to be used to identify an associated entity; and
    embedding a microchip into the second portion of the at least one card layer.

11. The method of claim 10, wherein creating the at least one card layer comprises using plastic, metal, fabric, or a combination thereof.

12. The method of claim 10, wherein creating the at least one card layer comprises creating a first fabric layer, a second fabric layer, and a stiff substrate layer in between.

13. The method of claim 10, further comprising applying an adhesive to fasten the at least one card layer to another card layer of the authentication card.

14. The method of claim 10, further comprising generating a fabric cut-out design matching the card design.

15. The method of claim 14, wherein the stitching design is configured to attach the fabric cut-out design into the card design through the plurality of apertures using the thread, and the thread comprises a natural fiber thread, a synthetic fiber thread, a metal wire thread, or a combination thereof.

16. The method of claim 10, wherein the stitching design comprises one or more stitches including a straight stitch, triple stretch stitch, zigzag stitch, triple zigzag stitch, elastic stitch, stretch zigzag stitch, blind hem stitch, stretch blind hem stitch, shell tuck stitch, elastic shell tuck stitch, bland stitch, ladder stitch, elastic overlock stitch, double overlock stitch, double action stitch, slant pin stitch, slant overlock stitch, feather stitch, tree stitch, bridging stitch, fagoting stitch, honeycomb stitch, scallop stitch, buttonhole, and/or keyhole buttonhole.

\* \* \* \* \*